United States Patent
Krause et al.

(10) Patent No.: US 8,945,434 B2
(45) Date of Patent: Feb. 3, 2015

(54) ANTISTATIC OR ELECTRONICALLY CONDUCTIVE POLYURETHANES, AND METHOD FOR THE PRODUCTION THEREOF

(75) Inventors: Jens Krause, Mours-Saint-Eusébe (FR); Bernd Breuer, Schleiden Morsbach (DE); Maren Heinemann, Bergisch Gladbach (DE); Ralf Jumel, Leverkusen (DE)

(73) Assignee: Future Carbon GmbH (DE)

( * ) Notice: Subject to any disclaimer, the term of this patent is extended or adjusted under 35 U.S.C. 154(b) by 931 days.

(21) Appl. No.: 13/059,572

(22) PCT Filed: Aug. 12, 2009

(86) PCT No.: PCT/EP2009/005840
§ 371 (c)(1),
(2), (4) Date: Mar. 11, 2011

(87) PCT Pub. No.: WO2010/020367
PCT Pub. Date: Feb. 25, 2010

(65) Prior Publication Data
US 2011/0147675 A1 Jun. 23, 2011

(30) Foreign Application Priority Data
Aug. 20, 2008 (DE) .......... 10 2008 038 524

(51) Int. Cl.
H01B 1/24 (2006.01)
C08L 75/04 (2006.01)

(52) U.S. Cl.
CPC .................. C08L 75/04 (2013.01)
USPC .......... 252/511; 252/502; 524/495; 524/496

(58) Field of Classification Search
CPC .... B82Y 30/00; C08K 3/04; C08K 2201/011; C08K 2201/017; C08K 5/0075; H01B 1/24
USPC ............ 252/502, 511; 524/495, 496
See application file for complete search history.

(56) References Cited

U.S. PATENT DOCUMENTS

| | | | |
|---|---|---|---|
| 3,054,565 A | 9/1962 | Willems | |
| 4,526,952 A | 7/1985 | Zeitler et al. | |
| 2003/0213939 A1* | 11/2003 | Narayan et al. | 252/500 |
| 2008/0035894 A1 | 2/2008 | Ehbing et al. | |
| 2009/0140215 A1 | 6/2009 | Buchholz et al. | |
| 2010/0210804 A1 | 8/2010 | Guntherberg et al. | |

FOREIGN PATENT DOCUMENTS

| | | |
|---|---|---|
| DE | 3528597 | 2/1986 |
| DE | 19720959 | 11/1998 |
| DE | 19858825 | 6/2000 |
| DE | 102005006765 | 8/2006 |
| DE | 102006037582 | 2/2008 |
| EP | 56004 | 7/1982 |
| EP | 0129193 | 12/1984 |
| EP | 205556 | 12/1986 |
| GB | 1469930 | 4/1977 |
| WO | WO-86/03455 | 6/1986 |
| WO | WO-2006/050903 | 5/2006 |

OTHER PUBLICATIONS

Urban, K., et al., *Rotor-Stator and Disc Systems for Emulsification Processes*, pp. 24-31, Chem. Eng. Technol. 2006, 29, No. 1, 2006 Wiley-VCH Verlag GmbH & Co. KGaA, Weinheim.
Bacon, R., *Growth, Structure, and Properties of Graphite Whiskers*, pp. 283-290, Journal of Applied Physics, vol. 31, No. 2, Feb. 1960.
Zhou, O., et al., *Defects in Carbon Nanostructures*, pp. 1744-1747, Science, vol. 263, Mar. 25, 1994.
Lavin, J.G., et al., *Scrolls and nested tubes in multiwall carbon nanotubes*, pp. 1123-1130, Carbon 40, Elsevier Science Ltd. (2002).
Oberlin, A., et al., *High resolution electron microscope observations of graphitized carbon fibers*, pp. 133-135, Carbon 14, 1976.

* cited by examiner

*Primary Examiner* — Mark Kopec
*Assistant Examiner* — Haidung Nguyen
(74) *Attorney, Agent, or Firm* — Drinker Biddle & Reath LLP

(57) ABSTRACT

The present invention relates to an antistatic or electrically conductive, thermoset polyurethane obtained by reacting A) an organic polyisocyanate; B) a compound comprising NCO-reactive groups; and C) optionally a catalyst, a blowing agent, an auxiliary, an additive, or mixtures thereof; and wherein, the polyurethane comprises a carbon nanotube present in an amount of from 0.1 to 15% by weight based on the total weight of the polyurethane.

16 Claims, No Drawings

US 8,945,434 B2

ANTISTATIC OR ELECTRONICALLY CONDUCTIVE POLYURETHANES, AND METHOD FOR THE PRODUCTION THEREOF

CROSS REFERENCE TO RELATED APPLICATIONS

This application is a national stage application (under 35 U.S.C. §371) of PCT/EP2009/005840, filed Aug. 12, 2009, which claims benefit of German application 102008038524.7, filed Aug. 20, 2008.

BACKGROUND OF THE INVENTION

The invention relates to antistatic or electrically conductive thermoset polyurethanes, in particular casting elastomers and casting resins, which contain conductive carbon nanotubes, a process for producing them and their use for producing, for example, coatings, rolls, rollers and wheels.

Polyurethanes have been known for a long time and are notable for their great variety. An overview of polyurethanes, their properties and uses is given, for example, in Kunststofthandbuch, Volume 7, Polyurethane, 3rd revised edition, Volume 193, edited by Prof. Dr. G. W. Becker and Prof. Dr. D. Braun (Carl-Hanser-Verlag, Munich, Vienna).

In addition to flexible and rigid foams, unfoamed, noncellular polyurethanes, e.g. casting elastomers and casting resins, are also of interest. Particularly noncellular polyurethanes or polyurethanes having a bulk density of >500 kg/m$^3$ are used in fields where not only the excellent materials properties but also antistatic or electrically conductive properties are important. Mention may here be made of floor coverings, tires, paintable rollers, rolls and embedding materials for electricals. Charges are to be avoided at all costs especially in some highly sensitive industrial equipment. Like most other polymers, polyurethanes are not conductive per se. Conventional surface resistances are in the region of $10^{13}$ ohm.

Numerous additives have been used to reduce this high resistance. Very early on, salts such as ammonium salts (e.g. Catafor® from Rhodia GmbH) were used to reduce the surface resistance. Unfortunately, these additives have the disadvantage of accelerating hydrolysis of polyurethanes based on polyester polyols. Furthermore, migration to the surfaces and, associated therewith, "chalking" is a great disadvantage. In addition, the effects achieved are comparatively small and the surface resistance is reduced by only 2-3 powers of ten.

Apart from the use of these salts, the use of conductive carbon black (for example conductive carbon black having a BET surface area of from 600 to 1200 m$^2$/g; for example Ketjenblack® from Akzo Nobel Polymer Chemicals by) or of carbon fibers is also known. The use of conductive carbon black is described, for example, in EP-A 0 129 193 and DE-A 3 528 597. Conductive carbon blacks enable good surface resistances to be achieved in foamed and unfoamed polyurethanes (clown to $10^4$ ohm). However, the amounts of conductive carbon black required always result in a very high viscosity of the reaction components, so that such systems can no longer be processed using conventional polyurethane machines. Such systems are therefore hardly used at all in industry. Significantly lower viscosities can be achieved by use of carbon fibers, as described in DE-A 19 858 825. Surface resistances below $10^4$ ohm at just acceptable processing viscosities are achieved using relatively high concentrations of carbon fibers. However, in use it is found that in the case of mechanically stressed parts the fibers break and the conductivity decreases very quickly until a nonconductive polyurethane is obtained again. This breaking of the fibers occurs during processing, so that such PUR systems are not used in industry.

Furthermore, the use of graphites (e.g. Cond 8/96 from Graphit Kopfmühl AG) is conceivable for reducing the electrical resistance. However, to obtain a usable conductivity, concentrations which would mean α-considerable viscosity increase and therefore rule out industrial processing would be required in the polyurethane reaction system.

Disadvantages of the incorporation of carbon nanotubes are the difficulty of dispersing them and the high processing viscosity.

BRIEF DESCRIPTION OF THE INVENTION

It was therefore all object of the invention to provide a process for producing electrically conductive or antistatic polyurethanes, by means of which it is possible to process the reaction components for producing polyurethanes industrially; in particular, the viscosity of the reaction mixture should not increase during processing and the conductivity of the polyurethane should not decrease over time due to stress and a fine, uniform distribution, in particular of the carbon nanotubes, should be present.

This object has surprisingly been achieved by a particular dispersion process (process according to the rotor-stator principle) using carbon nanotubes in particular amounts.

The invention provides a process for producing antistatic or electrically conductive parts/articles composed of thermoset polyurethanes, where the polyurethane can be obtained by reaction of organic polyisocyanates (A) with compounds (B) containing NCO-reactive groups, optionally using catalysts and optionally with addition of blowing agents and auxiliaries and/or additives, which is characterized in that a) carbon nanotubes are mixed into the compounds (B) containing NCO-reactive groups and/or the polyisocyanates (A) in an amount of from 0.1 to 15% by weight, preferably from 1 to 10% by weight, particularly preferably from 1 to 3% by weight, based on the reaction mixture of polyisocyanates (A) and compounds (B) containing NCO-reactive groups at a power density of from $10^2$ kW/m$^3$ to $10^{14}$ kW/m$^3$, preferably from $10^4$ kW/m$^3$ to $10^{13}$ kW/m$^3$, b) the components (A) and (B) are mixed with one another to give a reaction mixture, with (A) and/or (B) containing carbon nanotubes from step a), c) the reaction mixture from b) is introduced into a mold or applied to a substrate, d) the polyurethane is cured.

The power density is based on the volume of suspension which is actually subject to the stress, In the case of rotor-stator systems, this means the chamber contents, in the case of nozzle systems the volume of the holes and in the case of high-speed stirrer discs (toothed discs) the space in the immediate vicinity of the disc.

The mixing in step a) is preferably carried out according to the rotor-stator principle, The invention further provides antistatic or electrically conductive, thermoset polyurethanes which can be obtained by reacting organic polyisocyanates (A) with compounds (B) containing NCO-reactive groups, optionally with addition of catalysts, optionally blowing agents and auxiliaries and/or additives, characterized in that the polyurethanes contain carbon nanotubes in an amount of from 0.1 to 15% by weight, preferably from 1 to 10% by weight, particularly preferably from 1 to 3% by weight, based on the total weight of polyurethane.

The carbon nanotubes used in the process of the invention are present as agglomerates having a diameter of from 100 to 1000 µm. After dispersion, the carbon nanotubes preferably have a proportion of from 30 to 90% by weight having a particle size of <40 µm and a proportion of from 10 to 70% by weight having a particle size of from 40 to 1000 µm, worth more than 90% of the coarse particles present having a diameter of from 100 to 200 µm.

DETAILED DESCRIPTION OF THE INVENTION

The dispersing operation in step a) of the process of the invention is preferably carried out in dispersing apparatuses having a high local energy input, preferably by means of dispersing discs and rotor-stator systems, e.g. colloid mills, toothed dispersing machines, etc.

The rotor-stator principle is a technique known per se by means of which fillers or the like are uniformly distributed under high shear forces in liquid media. Rotor-stator machines enable solid and liquid media to be dispersed in a liquid matrix. The technique and the machines used are comprehensively described in Rotor-Stator and Disc Systems for Emulsification Processes; Kai Urban, Gerhard Wagner, David Schaffner, Danny Röglin, Joachim Ulrich; Chemical Engineering & Technology, 2006, Vol. 29, No, 1, pages 24 to 31; DE-A 10 2005 006 765, DE-A 197 20 959 and U.S. Pat. No. 3,054,565.

The reaction mixture of the components and the carbon nanotubes for producing the polyurethanes according to the invention displays a sufficiently low viscosity which barely increases, if at all, over a prolonged period of time and during processing, so that the mixture is readily processable in industry. In addition, the conductivity of the polyurethanes of the invention is maintained under stress.

The polyurethanes of the invention preferably have bulk densities of from 200 kg/m³ to 1400 kg/m³, particularly preferably from 600 kg/m³ to 1400 kg/m³ and very particularly preferably from 800 kg/m³ to 1400 kg/m³.

Noncellular polyurethanes, e.g. casting elastomers and casting resins, are preferred.

The polyisocyanates suitable for producing polyisocyanate polyaddition compounds, in particular polyurethanes, are the organic aliphatic, cycloaliphatic, aromatic or heterocyclic polyisocyanates which have at least two isocyanate groups per molecule and are known to those skilled in the art, and also mixtures thereof. Examples of suitable aliphatic or cycloaliphatic polyisocyanates are diisocyanates or triisocyanates, e.g. butane diisocyanate, pentane diisocyanate, hexane diisocyanate (hexamethylene diisocyanate, HDI), 4-isocyanatomethyloctane 1,8-diisocyanate (triisocyanatononane, TIN) and cyclic systems such as 4,4'-methylenebis(cyclohexyl isocyanate), 3,5,5-trimethyl-1-isocyanato-3-isocyanatomethylcyclohexane (isophorone diisocyanate, IPDI) and also ω,ω'-diisocyanato-1,3-dimethylcyclohexane (H₆XDI). As aromatic polyisocyanates, it is possible to use, for example, naphthalene 1,5-diisocyanate, diisocyanatodiphenylmethane (2,2'-, 2,4'- and 4,4'-MDI or mixtures thereof), diisocyanatomethylbenzene (tolylene 2,4- and 2,6-diisocyanate, TDI) and industrial mixtures of the two isomers and also 1,3-bis(isocyanato-methyl)benzene (XDI). Furthermore, it is possible to use TODI (3.3'-dimethylbiphenyl 4,4'-diisocyanate), PPDI (para-phenylene 1,4-diisocyanate) and CHDI (cyclohexyl diisocyanate).

In addition, it is also possible to use downstream products of the abovementioned organic aliphatic, cycloaliphatic, aromatic or heterocyclic polyisocyanates which have a carbodiimide, uretdione, allophanate, biuret and/or isocyanurate structure and are known per se, and also prepolymers obtained by reaction of the polyisocyanate with compounds having groups which are reactive toward isocyanate groups.

The polyisocyanate component can be present in a suitable solvent. Suitable solvents are those which have a sufficient solvent capability for the polyisocyanate component and are free of groups which are reactive toward isocyanates. Examples of such solvents are acetone, methyl ethyl ketone, cyclohexanone, methyl isobutyl ketone, methyl isoamyl ketone, diisobutyl ketone, ethyl acetate, n-butyl acetate, ethylen glycol diacetate, butyrolactone, diethyl carbonate, propylene carbonate, ethylene carbonate, N,N-dimethylformamide, N,N-dimethylacetamide, N-methylpyrrolidone, N-ethylpyrrolidone, methylal, ethylal, butylal, 1,3-dioxolane, glycerol formal, benzene, toluene, n-hexane, cyclohexane, solvent naphtha, 2-methoxypropyl acetate (MPA).

In addition, the isocyanate component can contain customary auxiliaries and additives, e.g. rheology improvers (for example ethylene carbonate, propylene carbonate, dibasic esters, citric esters), stabilizers (for example Bronsted and Lewis acids such as hydrochloric acid, phosphoric acid, benzoyl chloride, organomineral acids such as dibutyl phosphate, also adipic acid, malic acid, succinic acid, tartaric acid or citric acid), UV stabilizers (for example 2,6-dibutyl-4-methylphenol), hydrolysis inhibitors (for example sterically hindered carbodiimides), emulsifiers and also catalysts (for example trialkylamines, diazabicyclooctane, tin dioctoate, dibutyltin dilaurate, N-alkylmorpholine, lead octoate, zinc octoate, tin octoate, calcium octoate, magnesium octoate, the corresponding naphthenates and p-nitrophenoxides and/or phenyl mercury neodecanoate) and fillers (for example chalk), optionally dyes which can be incorporated into the polyurethane/polyurea to be formed later (and thus have Zerevitinov-active hydrogen atoms) and/or color pigments.

As NCO-reactive compounds, it is possible to use all compounds known to those skilled in the art.

As NCO-reactive compounds, it is possible to use polyether polyols, polyester polyols, polycarbonate polyols and polyetheramines which have an average OH or NH functionality of at least 1.5 and also short-chain polyols and polyamines (chain extenders or crosslinkers), as are adequately known from the prior art. These can be, for example, low molecular weight diols (e.g. 1,2-ethanediol, 1,3- or 1,2-propanediol, 1,4-butanediol), triols (e.g. glycerol, trimethylolpropane) and tetraols (e.g. pentaerythritol) or else relatively high molecular weight polyhydroxy compounds such as polyether polyols, polyester polyols, polycarbonate polyols, polysiloxane polyols, polyamines and polyetherpolyamines and also polybutadiene polyols.

Polyether polyols can be obtained in a manner known per se by alkoxylation of suitable starter molecules in the presence of basic catalysts or using double metal cyanide compounds (DMC compounds). Suitable starter molecules for the preparation of polyether polyols are, for example, simple, low molecular weight polyols, water, organic polyamines having at least two N—H bonds or any mixtures of such starter molecules. Preferred starter molecules for preparing polyether polyols by alkoxylation, in particular by the DMC method, are, in particular, simple polyols such as ethylene glycol, 1,3-propylene glycol and 1,4-butanediol, 1,6-hexanediol, neopentyl glycol, 2-ethylhexane-1,3-diol, glycerol, trimethylolpropane, pentaerythritol and also low molecular weight, hydroxyl-containing esters of such polyols with dicarboxylic acids of the type mentioned by way of example below or low molecular weight ethoxylation or propoxylation products of such simple polyols or any mixtures of such modified or unmodified alcohols. Alkylene oxides which are suitable for the alkoxylation are, in particular, ethylene oxide and/or propylene oxide, which can be used in any order or in admixture in the alkoxylation.

Polyester polyols can be prepared in a known manner by polycondensation of low molecular weight polycarboxylic acid derivatives, for example succinic acid, adipic acid, suberic acid, azelaic acid, sebacic acid, dodecanedioic acid, tetrahydrophthalic anhydride, hexahydrophthalic anhydride, tetrachlorophthalic anhydride, endomethylenetetrahydrophthalic hydride, glutaric anhydride, maleic acid, maleic anhydride, fumaric acid, dimeric fatty acid, trimeric fatty acid, phthalic acid, phthalic anhydride, isophthalic acid, terephthalic acid, citric acid or trimellitic acid, with low molecular weight polyols, for example ethylene glycol, diethylene glycol, neopentyl glycol, hexanediol, butanediol, propylene glycol, glycerol, trimethylolpropane 1,4-hydroxymethyl-cyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol, or by ring-opening polymerization of cyclic carboxylic esters such as ε-caprolactone. In addition, hydroxycarboxylic acid derivatives, for example lactic acid, cinnamic acid or ω-hydroxycaproic acid, can be polycondensed to form polyester polyols. However, it is also possible to use polyester polyols of oleochemical origin. Such polyester polyols can be prepared, for example, by full ring opening of epoxidized triglycerides of at least one fat mixture containing at least some olefinically unsaturated fatty acids using one or more alcohols having from 1 to 12 carbon atoms and subsequent partial transesterification of the triglyceride derivatives to form alkyl ester polyols having from 1 to 12 carbon atoms in the alkyl radical.

The preparation of suitable polyacrylate polyols is known per se to those skilled in the art. They are obtained by free-radical polymerization of hydroxyl-containing, olefinically unsaturated monomers or by free-radical copolymerization of hydroxyl-containing, olefinically unsaturated monomers with, optionally, other olefinically unsaturated monomers such as ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable hydroxyl-containing, olefinically unsaturated monomers are, in particular, 2-hydroxyethyl acrylate, 2-hydroxyethyl methacrylate, the hydroxypropyl acrylate isomer mixture which can be obtained by addition of propylene oxide onto acrylic acid and the hydroxypropyl methacrylate isomer mixture which can be obtained by addition of propylene oxide onto methacrylic acid. Suitable free-radical initiators are those from the group consisting of azo compounds, for example azoisobutyronitrile (AIBN), or from the group consisting of peroxides, for example di-tert-butyl peroxide.

The NCO-reactive compound can be present in a suitable solvent. Suitable solvents are those which have a sufficient solvent capability for the NCO-reactive compound. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-di-methylacetamide, N-methylpyrrolidone, N-ethylpyrrolidone, methylal, ethylal, butylal, 1,3-dioxolane, glycerol formal, benzene, toluene, n-hexane, cyclohexane, solvent naphtha, 2-methoxypropyl acetate (MPA). In addition, the solvents can also bear groups which are reactive toward isocyanates. Examples of such reactive solvents are those which have an average functionality of groups which are reactive toward isocyanates of at least 1.8. These can be, for example, low molecular weight diols (e.g. 1,2-ethanediol, 1,3- or 1,2-propanediol, 1,4-butanediol), triols (e.g. glycerol, trimethylolpropane) or else low molecular weight diamines such as polyaspartic esters.

The polyetheramines which can be used as NCO-reactive compound are, in particular, diamines or triamines. Such compounds are marketed, for example, by Huntsman under the trade name Jeffamine® or by BASF as polyetheramines.

The NCO-reactive compound can contain the short-chain polyols or polyamines as crosslinker component or chain extender. Typical chain extenders are diethylenetoluenediamine (DETDA), 4,4'-methylenebis(2,6-diethylaniline) (MDEA), 4,4'-methylenebis(2,6-diisopropylaniline) (MDIPA), 4,4'-methylenebis(3-chloro-2,6-diethylaniline) (MCDEA), dimethylthiotoluenediamine (DMTDA, Ethacure® 300), N,N'-di(sec-butyl)aminobiphenylmethane (DB-MDA, Unilink® 4200) or N,N'-di-sec-butyl-p-phenylenediamine (Unilink® 4100), 3,3'-dichloro-4,4'-diaminodiphenylmethane (MBOCA), trimethylene glycol di-p-aminobenzoate (Polacure 740M). Aliphatic amine chain extenders can likewise be used or concomitantly used. 1,3-Propanediol, 1,4-butanediol, 2,3-butanediol, 1,5-pentanediol, 1,6-hexanediol and HQEE (hydroquinone di(β-hydroxyethyl)ether).

The process for producing the polyisocyanate polyaddition products can be carried out in the presence of customary rheology improvers, stabilizers, UV stabilizers, catalysts, hydrolysis inhibitors, emulsifiers, fillers, optionally incorporatable dyes (which thus have Zerevitinov-active hydrogen atoms) and/or color pigments. Preference is also given to addition of zeolites.

Preferred auxiliaries and additives are blowing agents, fillers, chalk, carbon black, flame retardants, color pastes, water, microbicides, flow improvers, thixotropes, surface modifiers, retarders in the production of the polyisocyanate polyaddition products. Further auxiliaries and additives encompass antifoams, foam stabilizers, cell regulators and fillers. Typical blowing agents are fluorinated hydrocarbons, pentane, cyclopentane, water and/or carbon dioxide.

The polyurethanes produced according to the invention can contain fillers such as chalks, silicates, dolomites and aluminum hydroxides. These fillers which are known in polyurethane chemistry can be present in concentrations of up to 25% by weight, based on the polyurethane. These can also contain additional additives which increase the conductivity, e.g. conductive carbon black and/or carbon fibers. The conductive carbon black preferably has a surface area (measured by the BET method in accordance with ASTM D 6556-04) of from 600 to 1200 $m^2/g$, an absorption pore volume (in accordance with ASTM D 2414-05a using the absorption medium n-dibutyl phthalate at about 23° C.) of from 300 to 450 $cm^3/$100 g of carbon black, a pour density (in accordance with ASTM D 1513-05) of from 20 to 250 $kg/m^3$ and an average particle diameter of less than 50 nm. The carbon fibers preferably have a thickness diameter of from 2 μm to 10 μm.

An overview of polyurethanes, their properties and uses is given, for example, in Kunststofthandbuch, Volume 7, Polyurethane, 3rd revised edition, Volume 193, edited by Prof. Dr. G. W. Becker and Prof. Dr. D. Braun (Carl-Hanser-Verlag, Munich, Vienna).

It has surprisingly been found that incorporation of the carbon nanotubes by means of a rotor-stator system makes it possible to produce electrically conductive or antistatic polyurethanes 10 without problems occurring in the processing of the reaction mixture. The viscosities of the reaction components to be processed are low despite the carbon nanotubes present, and a good conductivity (surface resistance of preferably <$10^7$ ohm) is obtained even at small amounts of carbon nanotubes.

The polyurethanes can be foamed or noncellular.

The polyurethanes of the invention are used, for example, for surface-coatable, electrically shielding or electrostatically discharging materials, e.g. for floor coverings, tires, wheels, rollers, rolls, materials for encapsulating electric components, housing parts and other industrial parts/articles.

In the prior art, the term carbon nanotubes is mainly used to refer to cylindrical carbon tubes having a diameter of from 3 to 100 nm and a length which is many times the diameter. These tubes comprise one or more layers of ordered carbon atoms and have a core which has a different morphology. These carbon nanotubes are also referred to as, for example, "carbon fibrils" or "hollow carbon fibers".

Carbon nanotubes have been known for a long time in the technical literature. Although Iijima (Publication: S. Iijima, Nature 354, 56-58, 1991) is generally referred to as the discoverer of nanotubes, these materials, in particular fibrous graphite materials having a plurality of graphite layers, have been known since the 1970s or early 1980s. Tates and Baker (GB 1 469 930 A1, 1977 and EP 56004 A2) described for the first time the deposition of very fine fibrous carbon from the catalytic decomposition of hydrocarbons. However, the carbon filaments produced on the basis of short-chain hydrocarbons were not characterized in more detail in terms of their diameter.

Usual structures of these carbon nanotubes are those of the cylinder type. Among cylindrical structures, a distinction is made between single wall carbon nanotubes and multiwall cylindrical carbon nanotubes. Customary processes for producing these are, for example, arc discharge, laser ablation, CVD process and catalytic CVD process (CCVD process).

The formation of carbon nanotubes which comprise two or more graphite layers and are rolled up to form a seamlessly closed cylinder and nested into one another in the arc discharge process is known from Iijima, Nature 354, 1991, 56-8. Depending on the rolling-up vector, chiral and achiral arrangements of the carbon atoms relative to the longitudinal axis of the carbon fibers are possible.

Structures of carbon tubes in which a single contiguous graphite layer (scroll type) or interrupted graphite layers (onion type) form the basis of the structure of the nanotubes were described for the first time by Bacon et al., J. Appl. Phys. 34, 1960, 283-90. The structure is referred to as the scroll type. Later, corresponding structures were also found by Zhou et al., Science, 263, 1994, 1744-47 and by Lavin et al., Carbon 40, 2002, 1123-30.

For the purposes of the invention, carbon nanotubes are all single-wall or multiwall carbon nanotubes of the cylinder type, scroll type or those having an onion-like structure. Preference is given to using multiwall carbon nanotubes of the cylinder type, scroll type or mixtures thereof.

Particular preference is given to using carbon nanotubes having a ratio of length to external diameter of greater than 5, preferably greater than 100.

The carbon nanotubes are particularly preferably used in the form of agglomerates, with the agglomerates having, in particular, an average diameter in the range from 0.05 to 5 mm, preferably from 0.1 to 2 mm, particularly preferably from 0.2 to 1 mm.

The carbon nanotubes to be used particularly preferably have essentially an average diameter of from 3 to 100 nm, preferably from 5 to 80 nm, particularly preferably from 6 to 60 nm.

Apart from the CNTs of the scroll type having only one continuous or interrupted graphite layer, there are also CNT structures which comprise a plurality of graphite layers which are assembled to form a stack and rolled up (multiscroll type). This CNT structure is related to the carbon nanotubes of the simple scroll type in the same way as the structure of multiwall cylindrical monocarbon nanotubes (cylindrical MWNT) is related to the structure of the single-wall cylindrical carbon nanotubes (cylindrical SWNT).

The processes known today for producing carbon nanotubes encompass arc discharge, laser ablation and catalytic processes. In many of these processes, carbon black, amorphous carbon and fibers having a large diameter are formed as by-products. In the case of the catalytic processes, a distinction can be made between deposition on supported catalyst particles and deposition on metal sites having diameters in the nanometer range formed in situ (known as flow processes). In production by the catalytic deposition of carbon from hydrocarbons which are gaseous under the reaction conditions (hereinafter referred to as CCVD; catalytic carbon vapor deposition), possible carbon donors are acetylene, methane, ethane, ethylene, butane, butene, butadiene, benzene and further hydrocarbon-containing starting materials. Preference is therefore given to using CNTs which can be obtained from catalytic processes.

The catalysts generally comprise metals, metal oxides or decomposable or reducible metal components. For example, Fe, Mo, Ni, V, Mn, Sn, Co, Cu and further transition elements are mentioned as metals for the catalyst in the prior art. Although the individual metals usually have a tendency to aid formation of carbon nanotubes, according to the prior art high yields and small proportions of amorphous carbon are advantageously achieved using metal catalysts which are based on a combination of the abovementioned metals. CNTs which can be obtained using mixed catalysts are therefore preferably used.

Particularly advantageous catalyst systems for producing CNTs are based on combinations of metals or metal compounds containing two or more of the elements from the group consisting of Fe, Co, Mn, Mo and Ni.

The formation of carbon nanotubes and the properties of the tubes formed depend, on the basis of experience, in a complex way on the metal component or a combination of a plurality of metal components used as catalysts, the catalyst support material which may optionally be used and the interaction between catalyst and support, the starting gas and partial pressure of the starting material, an addition of hydrogen or further gases, the reaction temperature and the residence time and the reactor used.

A particularly preferred process for producing carbon nanotubes is known from WO 2006/050903 A2.

The various processes mentioned using different catalyst systems produce carbon nanotubes of different structures which can be taken from the process predominantly as carbon nanotube powder.

The production of carbon nanotubes having diameters of below 100 nm was described for the first time in EP-B 205 556. To produce the carbon nanotubes, light (i.e. short- and medium-chain aliphatic or monocyclic or bicyclic aromatic) hydrocarbons and an iron-based catalyst over which carbon carrier compounds are decomposed at a temperature of above 800-900° C. are used.

WO 86/03455 A1 describes the production of carbon filaments which have a cylindrical structure having a constant diameter of from 3.5 to 70 nm, an aspect ratio (ratio of length to diameter) of greater than 100 and a core region. These fibrils comprise many, continuous layers of ordered carbon atoms which are arranged concentrically around the cylindrical axis of the fibrils. These cylindrical nanotubes were produced by a CVD process from carbon-containing compounds by means of a metal-containing particle at a temperature in the range from 850° C. to 1200° C.

WO 2007/093337 A2 has disclosed a process for producing a catalyst suitable for producing conventional carbon nanotubes having a cylindrical structure. When this catalyst was used in a fixed bed, relatively high yields of cylindrical carbon nanotubes having a diameter in the range from 5 to 30 nm were obtained.

A completely different way of producing cylindrical carbon nanotubes has been described by Oberlin, Endo and Koyam (Carbon 14, 1976, 133). Here, aromatic hydrocarbons, e.g. benzene, are reacted over a metal catalyst. The carbon tubes formed display a well-defined, graphitic hollow core having approximately the diameter of the catalyst particle on which further, less graphitically ordered carbon is present. The entire tubes can be graphitized by treatment at high temperature (from 2500° C. to 3000° C.).

Most of the abovementioned processes (using electric arcs, spray pyrolysis or CVD) are used today for producing carbon nanotubes. However, the production of single-wall cylindrical carbon nanotubes is very complicated in terms of apparatus and in the known processes proceeds at a very low formation rate and often also with many secondary reactions which lead to a high proportion of undesirable impurities, i.e. the yield from such processes is comparatively low. The production of such carbon nanotubes is therefore still extremely technically complicated even today and the carbon nanotubes are therefore used primarily in small amounts for highly specialized applications. The use thereof for the present application is conceivable but less preferred than the use of multiwall CNTs of the cylinder or scroll type.

The production of multiwall carbon nanotubes in the form of seamless cylindrical nanotubes nested within one another or in the form of the above-described scroll or onion structures, is nowadays carried out commercially in relatively large amounts predominantly using catalytic processes. These processes usually display a higher yield than the abovementioned arc discharge and other processes and are today typically carried out on the kg scale (some hundreds of kg/day worldwide). The MW carbon nanotubes produced in this way are generally considerably cheaper than the single-wall nanotubes.

The invention is illustrated by the following examples.

EXAMPLES

Starting Components

Polyol: Polyester polyol having an OH number of 50 mg KOH/mg and a viscosity of 1300 mPas at 75° C.
Crosslinker: 1,4-butanediol with activator Dabco® DC 2 (from Air Products) [40 ppm]
Isocyanate: Desmodur® PC-N (mixture of a prepolymer based on diphenylmethane 4,4'-diisocyanate and tripropylene glycol and also a carbodiimide-modified diphenylmethane 4,4'-diisocyanate having an NCO content of 26% by weight and a viscosity of 120 mPas at 25° C.)

The abovementioned three components were mixed with one another in such a way that the index was 103, with the polyol having a temperature of 80° C. and the isocyanate and the crosslinker having a temperature of 25° C. The mold temperature was 110° C.

Example 1

Comparison 1.5 parts by weight of Baytubes® C. 150 P in each case were added to 100 parts by weight of polyol and to 50.5 parts by weight of isocyanate and the mixture was stirred by means of a Pendraulic stirrer for 90 seconds at a speed of rotation of 4500 rpm. After dispersion, the predominant proportion of the carbon nanotubes was present in the form of agglomerates larger than 0.5 mm. Only a very small proportion of fines was present. The two abovementioned components containing Baytubes® C 150 P were subsequently mixed with 9.5 parts by weight of crosslinker and poured into a mold.

No conductivity was able to be measured (resistance >10" ohm).

Example 2

According to the Invention 1.5 parts of Baytubes® C 150 P in each case were incorporated separately into 100 parts by weight of polyol and into 50.5 parts by weight of isocyanate using a rotor-stator system (laboratory high-speed mixer CD 1000 from Cavitron v. Hagen & Funke GmbH). The mixing head of the rotor-stator system used is a toothed wheel system (Cavitron refers to it as chamber system). For this purpose, the polyol was firstly placed in an autoclave and heated to 80° C. While stirring, the Baytubes® C 150 P were added. The mixture was fed to the rotor-stator system at an admission pressure of 3 bar. Dispersion was carried out at a rotational speed of from 1750 to 2350 revolutions per minute. Dispersion was repeated once more. To disperse the carbon nanotubes in the isocyanate, the isocyanate was initially charged at room temperature and the Baytubes® C. 150 P were added while stirring. At an admission pressure of 3 bar, the mixture was fed to the rotor-stator system. Dispersion was carried out at a rotational speed of from 4650 to 5250 revolutions per minute. Dispersion in the rotor-stator system was carried out once. The maximum particle size of the agglomerates in the dispersions was 200 μm with a high proportion of fines. The viscosity was measured in accordance with EN ISO 3219/A.3 at 70° C. on the respective suspensions. Measurements of 2800 mPas for the polyol and of 200 mPas for the isocyanate were recorded. The polyol dispersion and the isocyanate dispersion were subsequently mixed with 9.5 parts by weight of crosslinker and poured into a mold. A surface resistance of $10^6$ ohm was measured (in accordance with DIN IEC 60093 (12.93)).

Example 3

According to the Invention

The procedure of example 2 was repeated, but dispersion was this time carried out twice in each case. The conductivity was able to be increased considerably in this way. A specific surface resistance of $10^4$ ohm was measured in accordance with DIN IEC 60093 (12.93) and a specific volume resistance of 230 ohm/m was measured in accordance with DIN IEC 60093 (12,93).

The invention claimed is:
1. An antistatic or electrically conductive, thermoset polyurethane obtained by reacting:
A) an organic polyisocyanate;
B) a compound comprising NCO-reactive groups; and

C) optionally a catalyst, a blowing agent, an auxiliary, an additive, or mixtures thereof; and wherein, the polyurethane comprises a carbon nanotube present in an amount of from 0.1 to 15% by weight based on the total weight of the polyurethane, and wherein the carbon nanotube has a proportion of from 30 to 90% by weight having a particle size of less than 40 μm; and a proportion of from 10 to 70% by weight having a particle size of from 40 to 1000 μm, wherein the carbon nanotubes having a particle size of from 40 to 1000 μm comprises more than 90% of particles having a diameter of from 100 to 200 μm.

2. The polyurethane according to claim 1 further comprising conductive carbon black, carbon fibers, or mixtures thereof.

3. The polyurethane according to claim 2, wherein the conductive carbon black has a surface area (measured by the BET method in accordance with ASTM D 6556-04) of from 600 to 1200 $m^2/g$, an absorption pore volume (in accordance with ASTM D 2414-05a using the absorption medium n-dibutyl phthalate at about 23° C.) of from 300 to 450 $cm^3/$100 g of carbon black, a pour density (in accordance with ASTM D 1513-05) of from 20 to 250 $kg/m^3$ and an average particle diameter of less than 50 nm; and wherein the carbon fibers have a thickness diameter of from 2 μm to 10 μm.

4. The polyurethane according to claim 1 having a bulk density (in accordance with DIN EN ISO 845-1995-06) of from 200 $kg/m^3$ to 1400 $kg/m^3$.

5. The polyurethane according to claim 1, wherein the composition is foamed or noncellular.

6. An electrically shielding or electrostatically discharging material coated with the polyurethane as claimed in claim 1.

7. The polyurethane according to claim 2, wherein the conductive carbon black has a surface area (measured by the BET method in accordance with ASTM D 6556-04) of from 600 to 1200 $m^2/g$, an absorption pore volume (in accordance with ASTM D 2414-05a using the absorption medium n-dibutyl phthalate at about 23° C.) of from 300 to 450 $cm^3/$100 g of carbon black, a pour density (in accordance with ASTM D 1513-05) of from 20 to 250 $kg/m^3$ and an average particle diameter of less than 50 nm;

wherein the carbon fibers have a thickness diameter of from 2 μm to 10 μm; and wherein the polyurethane has a bulk density (in accordance with DIN EN ISO 845-1995-06) of from 200 $kg/m^3$ to 1400 $kg/m^3$; and wherein the polyurethane is foamed or noncellular.

8. A process for producing an antistatic or electrically conductive thermoset polyurethane comprising I) providing
  A) an organic polyisocyanate;
  B) a compound comprising NCO-reactive groups,
  C) optionally a catalyst, a blowing agent, an auxiliary, an additive, or mixtures thereof; and II) mixing carbon nanotubes into (A), (B), or a mixture thereof at a power density of from $10^2$ $kW/m^3$ to $10^{14}$ $kW/m^3$, wherein the carbon nanotubes are present in an amount of from 0.1 to 15% by weight based on the total weight of (A) and (B);

III) reacting (A) with (B) and optionally a catalyst, a blowing agent, an auxiliary, an additive, or mixtures thereof to form a composition;

IV) introducing the composition into a mold or applying the composition to a substrate;

V) curing the composition to form an antistatic or electrically conductive thermoset polyurethane article or curing the composition to form an antistatic or electrically conductive thermoset polyurethane coated substrate, and wherein the carbon nanotube has a proportion of from 30 to 90% by weight having a particle size of less than 40 μm; and a proportion of from 10 to 70% by weight having a particle size of from 40 to 1000 μm, wherein the carbon nanotubes having a particle size of from 40 to 1000 μm comprises more than 90% of particles having a diameter of from 100 to 200 μm.

9. The process according to claim 8 which further comprises mixing conductive carbon black, carbon fibers, or a mixture thereof (II) or (III).

10. The process according to claim 9, wherein the conductive carbon black has a surface area (measured by the BET method in accordance with ASTM D 6556-04) of from 600 to 1200 $m^2/g$, an absorption pore volume (in accordance with ASTM D 2414-05a using the absorption medium n-dibutyl phthalate at about 23° C.) of from 300 to 450 $cm^3/$100g of carbon black, a pour density (in accordance with ASTM D 1513-05) of from 20 to 250 $kg/m^3$ and an average particle diameter of less than 50nm; and wherein the carbon fibers have a thickness diameter of from 2 μm to 10 μm.

11. The process according to claim 8 wherein polyurethane has a bulk density (in accordance with DIN EN ISO 845-1995-06) of from 200 $kg/m^3$ to 1400 $kg/m^3$.

12. The process according to claim 8, wherein the polyurethane is foamed or noncellular.

13. The process according to claim 9, which further comprises mixing conductive carbon black, carbon fibers, or a mixture thereof in (II) or (III), wherein the conductive carbon black has a surface area (measured by the BET method in accordance with ASTM D 6556-04) of from 600 to 1200 $m^2/g$, an absorption pore volume (in accordance with ASTM D 2414-05a using the absorption medium n-dibutyl phthalate at about 23° C.) of from 300 to 450 $cm^3/$100 g of carbon black, a pour density (in accordance with ASTM D 1513-05) of from 20 to 250 $kg/m^3$, and an average particle diameter of less than 50 nm;

wherein the carbon fibers have a thickness diameter of from 2 μm to 10 μm; and wherein the composition has a bulk density (in accordance with DIN EN ISO 845-1995-06) of from 200 $kg/m^3$ to 1400 $kg/m^3$; and wherein the composition is foamed or noncellular.

14. The process according to claim 8, wherein the mixing in step (II) is carried out in a rotor-stator system.

15. The process according to claim 8, wherein the carbon nanotubes are mixed with both (A) and (B) independently in step (II), and is each mixed at least twice in a rotor-stator system.

16. An electrically shielding or electrostatically discharging material coated with a composition obtained by the process as according to claim 8.

* * * * *